Jan. 12, 1960  S. P. HIGGINS, JR., ET AL  2,920,639
AIR-PRESSURE-OPERATED PILOT VALVE
Original Filed March 14, 1950  3 Sheets-Sheet 1

FIG. I

INVENTOR.
STEPHEN P. HIGGINS JR.
PEMBERTON H. DRINKER
BY
ATTORNEY

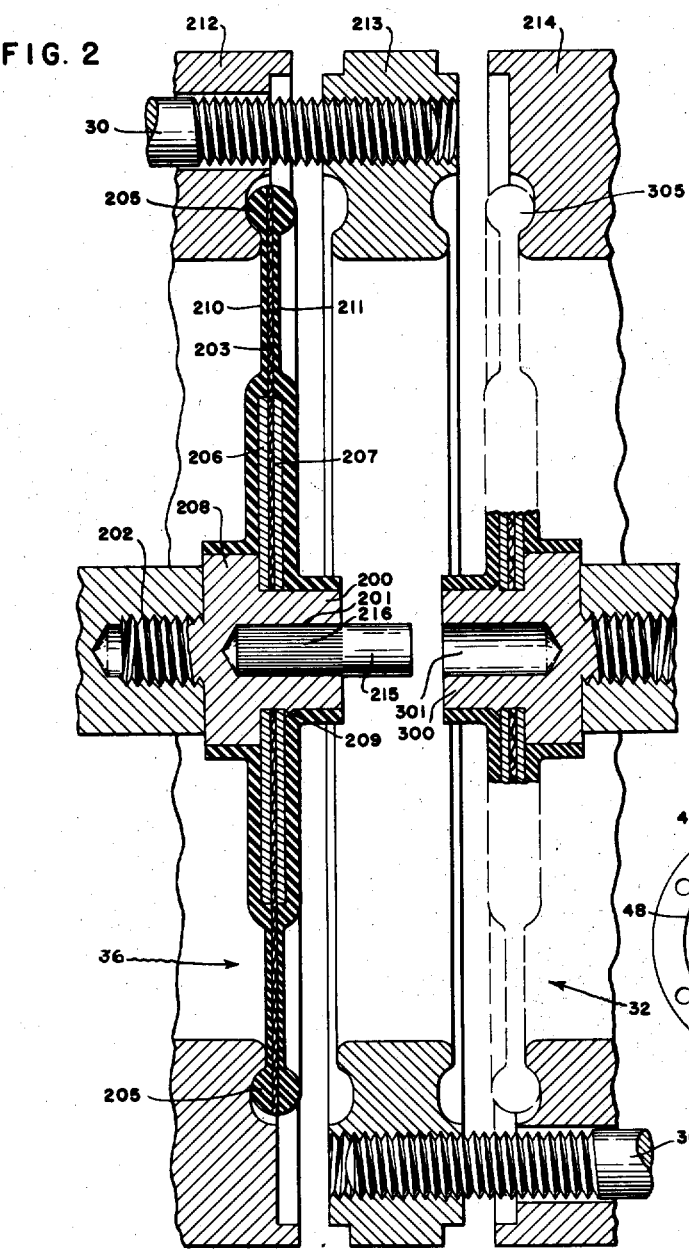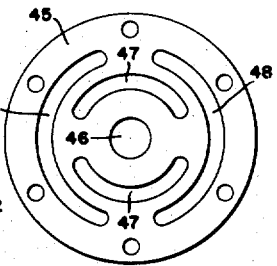
Fig. 2  
Fig. 3
INVENTOR.
STEPHEN P. HIGGINS JR.
PEMBERTON H. DRINKER
ATTORNEY.

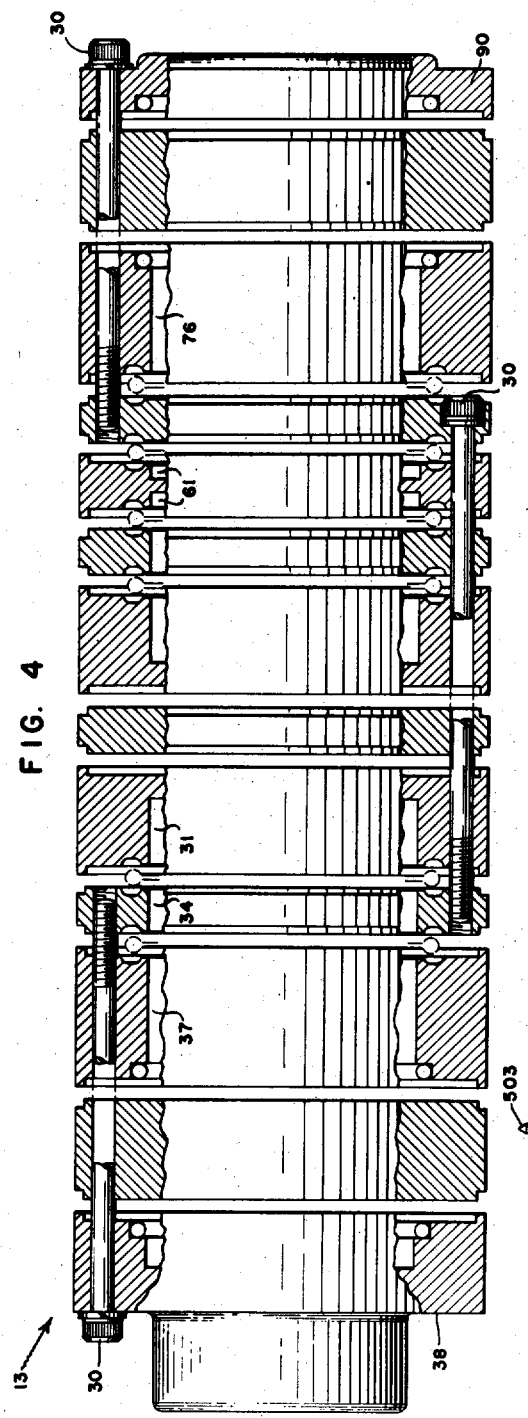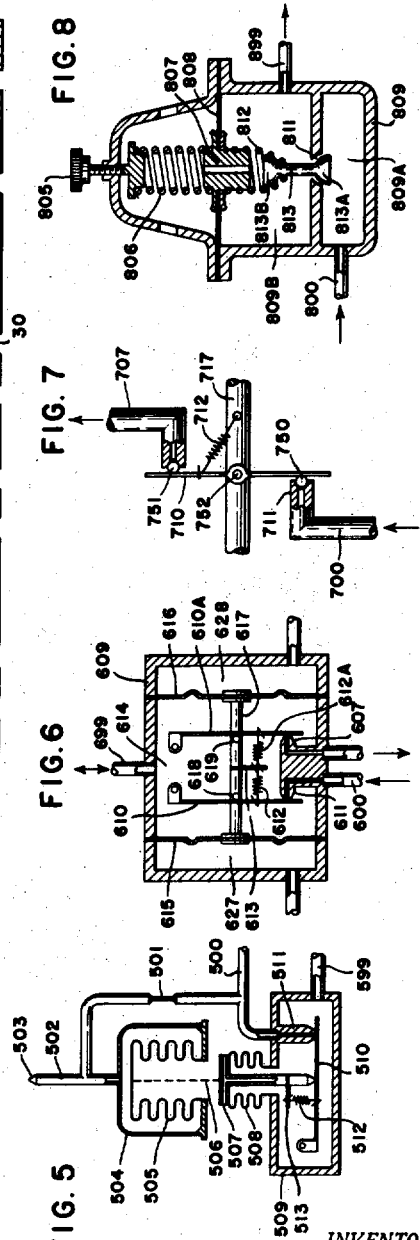

United States Patent Office 2,920,639
Patented Jan. 12, 1960

2,920,639
AIR-PRESSURE-OPERATED PILOT VALVE

Stephens P. Higgins, Jr., Philadelphia, Pa., and Pemberton H. Drinker, Dover, Mass., assignors to Minneapolis-Honeywell Regulator Company, Minneapolis, Minn., a corporation of Delaware Original application March 14, 1950, Serial No. 149,618, now Patent No. 2,724,398, dated November 22, 1955. Divided and this application April 13, 1955, Serial No. 501,099

7 Claims. (Cl. 137—82)

This application is a division of our co-pending application, Serial Number 149,618, filed March 14, 1950; Patent 2,724,398; issued November 22, 1955.

A general object of this invention is to provide a controller which is operative to establish a fluid output pressure varying in accordance with the time integral of the difference or deviation between the instantaneous value of a variable under control and a value, commonly referred to as the set point, at which it is desired to maintain the controlled variable. A controller of this type operates with proportional-speed floating action which may be defined as that mode of operation involving a continuous linear relation between deviation of the controlled variable from the set-point and rate of motion of the final control element.

Another object of this invention is to provide a unit formed of selectively attachable and detachable separate sections one or more of which may be used individually for the purpose for which it is designed or all used together to form the controller of this invention.

Another object of this invention is to provide a pneumatic controller including suitable adjustments for adapting it to control fluid motors of different capacities. To this end, there is provided a first pilot valve or relay which is arranged to be responsive to variations in the controlled variable, an adjustable capillary restriction in a conduit connecting the outlet of said pilot valve or relay to the input chamber, which preferably is of fixed capacity, of a second pilot valve or relay. Since the volume to which the output of the capillary restriction is applied is fixed, adjustment of the capillary restriction is operative, without affecting the calibration of the controller, to effect control of different volumes connected to the output of the second pilot valve or relay.

A more specific object is to provide an air-operated controller comprising first and second oppositely acting expansible chambers; a first pilot valve or relay having a third expansible chamber and actuated by any difference between the pressure applied to said first chamber and the pressure applied to the second chamber; a capillary restriction providing an outlet passage from the third expansible chamber; a fourth expansible chamber connected to the outlet of said capillary restriction and acting on said first pilot valve or relay oppositely to said third expansible chamber; a second pilot or relay actuated by the output pressure from said capillary restriction; and an air-operated motor responsive to the output pressure of said second pilot or relay and governing the final control element.

An additional object of this invention is the provision of a pilot valve or relay having inlet and outlet valves, each comprising stationary and movable valve parts, and a valve-actuating member, comprising a rod movable in response to variations in the measured variable, and a beam pivotally mounted on said rod and carrying the movable parts of the valves on it so that any looseness in the valve-actuating member or the valve parts is taken up and the valves caused to close tightly in the normal, non-functioning position of the pilot valve or relay.

An added object of this invention is the provision of a pilot valve or relay of novel and improved construction in which the valve-actuating element is biased to valve closing position by a spring which is fastened, at one end, to the valve-actuating member and, at its other end, to a movable valve element or to a member for actuating a movable valve element. This is in contrast to the devices now in use, in which the flapper or valve actuating member is biased to closed position by a spring which abuts, at one end, on the flapper, and, at the other end, against a stationary stop.

A still further object of this invention is to provide an air controller separated into chambers by a diaphragm of novel construction. This diaphragm consists of a metal body, a fabric disc mounted on said body, and a layer of rubber-like material such as "Neoprene" surrounding and enveloping both inserts and provided at its edge or rim with a ring-shaped flange or bead of circular, radial cross section.

The various features of novelty which characterize this invention are pointed out with particularity in the claims annexed to and forming a part of this specification. For a better understanding of this invention, however, its advantages and specific objects obtained with its use, reference should be had to the accompanying drawings and descriptive matter in which is illustrated and described a preferred embodiment of the invention.

Of the drawings:

Figure 2 is a diametral cross section showing a combined diaphragm and gasket and the pins and sockets by which the sections comprising the main unit are attached together.

Figure 3 is a perspective view showing a face elevation of a centering ring.

Figure 4 is a side elevation with the parts separated and cut away in longitudinal cross section.

Figures 5, 6, 7 and 8 are diagrams in partial cross section showing modifications.

Figure 1:
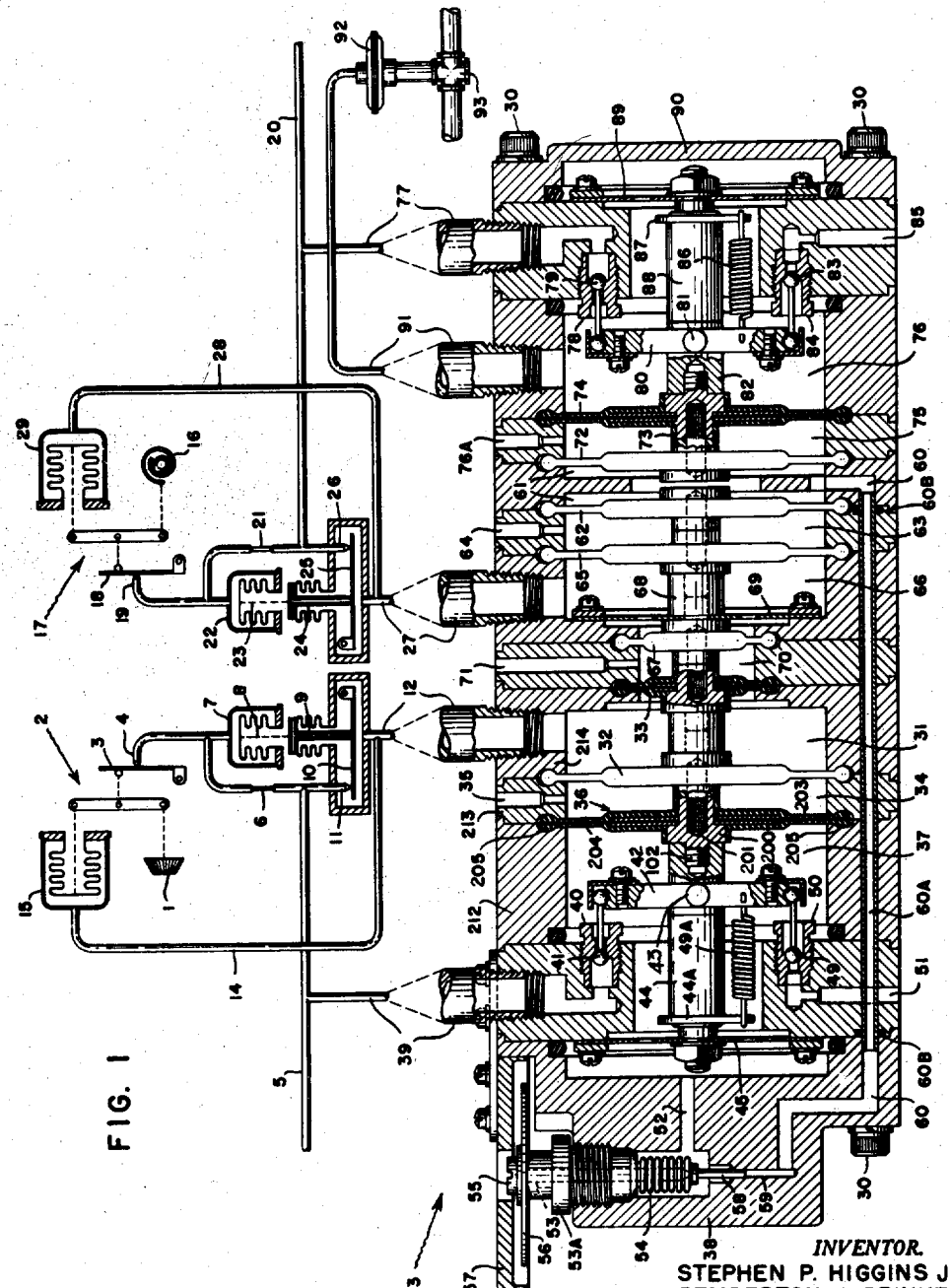
Figure 1 is a schematic diagram with the pilot or relay valves and the diaphragms and operating chambers for said valves shown in longitudinal cross section.

Fig. 1 shows that the controller of this invention includes a manually-operated, air-powered transmitter adapted to set up an air pressure proportional to the desired set point of the controller. This transmitter comprises a manually-operable knob or handle 1 which forms one input to a differential, generally indicated at 2. The output of differential 2 controls the position of flapper 3 cooperating with nozzle 4. Nozzle 4 is supplied with air from a source 5 of compressed air by means of a restriction 6. Nozzle 4 also communicates with a bellows motor 7 which has a mechanical connection 8 with a T-shaped, hollow exhaust valve 9 bearing, at its lower end, on a second flapper 10 which also cooperates with a main inlet nozzle 11. The output of this pilot or relay valve passes through pipe 12 to the main unit, generally indicated at 13. Pipe 12 also has a branch 14 which feeds back to a second bellows motor 15 forming the second input to differential 2 to reset flapper 3 in accordance with the output pressure in pipe 12.

The controller of this invention also includes an automatically actuated, air-powered transmitter operated from a measuring instrument 16 responsive to the controlled variable or quantity or condition which is being measured and controlled. Examples of such a controlled variable are temperature, pressure, flow, specific gravity, density, strain, chemical concentration, humidity, weight, position, etc. Measuring instrument 16 forms one input to a differential, generally indicated at 17. The output of differential 17 controls the position of a flapper 18 cooperating with a nozzle 19 which is supplied with air from a source 20 of compressed air through a restriction 21. Nozzle 19 also communicates with a bellows motor 22 which has mechanical connection 23 with a T-shaped, hollow exhaust valve 24 which cooperates, at its lower end, with a flapper 25. Flapper 25 also cooperates with a main inlet nozzle 26. The controlled air from this pilot or relay passes through a pipe 27 to the first chamber of the main unit 13. Pipe 27 has a branch 28 which communicates with a bellows motor 29 forming a second input to differential 17 so that the output pressure in pipe 27 resets flapper 18.

The main unit 13 comprises a hollow casing whose sides are made up of a number of cylindrical rings sealed together by ring-shaped gaskets forming the rims of disk-shaped diaphragms. The ends of this casing are formed of solid, disc-shaped caps. The rings and the caps are held together by a number of screws extending parallel to the longer axis of the hollow, generally cylindrical, casing. The heads of three of these screws are shown at 30 at three of the corners of the casing. The main unit 13 is made up of three separate, readily attachable and detachable sections. The left hand section, comprising all the parts to the left of diaphragm 36, is the first pilot valve or relay section. The middle section, comprising all the parts between the diaphragms 36 and 62, is the differential-air-pressure-operated motor. The right hand section, comprising all the parts to the right of diaphragm 62, is the second pilot valve or relay section. The differential motor and the first relay are connected to a first valve-actuating rod which is formed of a number of individual parts. The second relay has a second valve-actuating rod located centrally in it.

The ouput pressure of the manually operated transmitter is fed through pipe 12 to a second chamber 31 in unit 13. One wall of chamber 31 is formed by the large combined diaphragm and gasket 32 and the other wall of chamber 31 is formed by the small gasket and diaphragm 33. On the opposite side of gasket 32 is a sealing chamber 34 open to the atmosphere through an exhaust port 35 and having its opposite wall formed by gasket 36.

Chamber 37 has one end wall formed by gasket 36, its side walls formed by ring-shaped portions of the casing, and its other end wall formed by an end cap 38. Chamber 37 forms part of a first pilot or relay valve consisting of an inlet pipe 39, which communicates with a source 5 of compressed air and with an inlet valve seat 40, which is opened or closed by a ball valve 41. Valve 41 is pivoted at one end of a beam 42 which is itself pivoted at 43 on section 44 of a first, centrally located, valve-actuating rod on which diaphragms 32, 33 and 36 are also mounted. The left hand end of section 44 is supported in a flexible supporting ring 45 which is shown in greater detail in Fig. 3. On the opposite end of beam 42 is mounted a second ball valve 49 which cooperates with an outlet valve seat 50 communicating with the atmosphere through a vent passage 51. A spring 49A is secured at one end to beam 42 and at its opposite end to a disc 44A attached to section 44. Spring 49A biases ball valves 41 and 49 against their respective valve seats 40 and 50. Since spring 49A is biased between two parts of the movable, valve-actuating rod instead of being attached at one end to a stationary member, spring 49A prevents undesired violent, high-frequency, undamped oscillation of the ball valves. This oscillation is known as "chattering" and is particularly undesirable in control valves.

Fig. 1 shows combined diaphragm and gasket 36 which is typical of all the combined diaphragms and gaskets. Gasket 36 comprises a central, metal body 200 having in one side a smooth bored opening 201 and, projecting from the opposite face, a screw threaded stem 202. A perforated disc of fabric 203 is slid over the central body. Disc 203 is enveloped on both faces with a coating of a rubber-like material, such as "Neoprene." This coating has web portion 204 surrounding the rim of the fabric disc 203. At the outer edge or rim of the portion 204 is a ring 205 of circular shape in radial cross section. Ring 205 is adapted to be received in suitable openings in the casing rings so as to form a seal or gasket between adjacent rings.

Fig. 2 shows a preferred form of gasket 36. In this form, the body 200 has an opening 201 of smooth bore in one face and a projection 202 extending out of the opposite face and having screw threads on its outer surface. Slid over the outer surface of body 200 are metal rings 206 and 207. Ring 206 is held in position on body 200 by a flange or shoulder 208 while ring 207 is held in position on body 200 by staking, as indicated at 209. A centrally perforated disc of fabric 203 is mounted on the body 200 between the rings 206 and 207. Over the outer surface of the body 200, the rings 206 and 207, and the fabric disc 203 are layers of rubber-like material such as "Neoprene." These layers are indicated at 210 and 211. At the outer edge or rim of the combined diaphragm and gasket, layers 210 and 211 are enlarged so that, together with the enclosed portion of fabric disc 203, there is formed, at the outer edge of the combined diaphragm and gasket, a ring 205 of circular shape in radial cross section. This ring 205 forms a seal or gasket when it is lodged in suitable slots in the rings 212 and 213 which form part of the casing 13.

Fig. 2 also shows how parts are combined to form the first, centrally located, valve-actuating rod while, at the same time, the first relay section and the differential-pressure-operated motor section are readily attachable or detachable. This readily attachable and detachable connection is formed by a pin 215 which has a fluted surface 216 of suitable diameter to be received in opening 201 with a force or driving fit so that pin 215 is firmly secured to body 200. Diaphragm 32 has a body 300 provided with a smooth bore 301 in it. Bore 301 is of suitable diameter to receive the right hand end of pin 215 so that pin 215 is secured to body 300 with a sliding, readily attachable and detachable fit. Diaphragms 32 and 36 have their rims formed into ring-shaped gaskets 305 and 205, respectively. These ring-shaped gaskets are received in suitable openings in the ends of rings 212, 213, and 214, which form part of the casing of unit 13. Thus the combined diaphragms and gaskets seal the rings of the casing of unit 13 and provide air-tight chambers or compartments within the casing.

In Fig. 2, the ends of the bolts 30 opposite to the headed ends, which are seen in Fig. 1, appear. The inner ends of the bolts 30 are screw threaded and engage with screw threads in holes in ring 213, for example. Thus the bolts 30 connect the various sections which make up the unit 13 and secure the sections together to make up the composite unit.

Fig. 3 shows a centering ring. Ring 45 has a central perforation 46 through it around which are a pair of arcuate inner slots 47 which extend around the central opening 46 for the greater portion of a circle but which are separated at their ends by solid portions. Opposite these portions are a pair of outer slots 48 which also extend around the central opening 46 for the greater portion of a circle but which are separated at their ends by solid portions at right angles to the solid portions separating slots 47. Thus the central portion has a limited movement out of the plane of the disc-shaped centering ring moving about these solid portions with a motion similar to the motion of a gimbal about its axes spaced at 90°.

The capillary restriction, across which an air pressure responsive to the deviation is applied, is formed in end cap 38. This capillary restriction comprises passage 52 which leads to a chamber in which is mounted a screw 53. A sealing bellows 54 surrounds a portion of its outer surface. Screw 53 is rotatably mounted in cap 38 by means of a perforated bushing 53A and has a head 55 of non-circular shape, for receiving a wrench, or is provided with a groove in it, for a screw driver. An indicator 56 is secured to screw 53 and serves to indicate the position of screw 53 by cooperation with a window or other index in or on a guard or shield 57, which is fixed to cap 38. From one end of bellows 54 there projects a needle 58 which cooperates with the walls of passage 59 to form a tubular passageway of exceedingly small capillary dimensions therebetween. The length of this capillary passageway is adjusted by turning the screw 53.

An outlet passage 60 leads from passage 59 to a divided chamber 61 one wall of which is formed by a large combined diaphragm and gasket 62. The side of diaphragm 62 opposite to chamber 61 forms one wall of a sealing chamber 63 which communicates with the atmosphere through a vent 64. The opposite wall of this chamber 63 is formed by diaphragm 65. That portion of outlet passage 60 which passes through the rings forming part of the casing of unit 13 is sealed by a long tube 60A of suitable material, such as stainless steel. The tube 60A is sealed near its ends by O-rings 60B.

The air pressure, which represents the instantaneous value of the controlled variable as sensed by the measuring instrument 16, is fed through pipe 27 to chamber 66, one end wall of which is formed by the large diaphragm 65 while the other end wall is formed by the smaller diaphragm 67. A central section 68, which forms part of the first centrally located, beam-actuating rod, is slidably supported in a second centering ring 69 indentical with centering ring 45 shown in Fig. 3.

Diaphragms 33 and 67 form the end walls of a chamber 70 which communicates with the atmosphere through vent 71.

The opposite end wall of chamber 61 is formed by diaphragm 72 which is secured on the central section 73 forming part of a second, centrally located, beam-operating rod. The first, centrally located, beam-operating rod is supported in centering rings 45 and 69 and carries on it diaphragms 36, 32, 33, 67, 65, and 62. The second, centrally located, beam-operating rod is supported in centering ring 89 and carries on it diaphragms 72 and 74. Opposite diaphragm 72 is a diaphragm 74 which forms the other end wall of a chamber 75 which is connected to atmosphere by vent 76A. Diaphragms 72 and 74 thus form a relay or pilot having a one-to-one ratio. The purpose of this pilot or relay is to seal the air in chamber 76 from air which actuates or drives diaphragm 72 after passing through the capillary restriction 59.

Chamber 76 contains a second pilot or relay valve to which air is supplied from source 20 of compressed air to an inlet or supply pipe 77 which communicates at its inner end with an inlet valve seat 78 with which cooperates a ball valve 79 pivotally mounted on one end of a beam 80. Beam 80 is pivoted at 81 to a central section 82 which forms part of the second, beam-operating rod. The opposite end of beam 80 has pivotally mounted on it a ball valve 83 which cooperates with an outlet valve seat 84 communicating with an outlet passage 85 leading to atmosphere. Spring 86 is secured at one end to beam 80 and is fastened at its other end to a disc 87 fastened to section 88 of the second, centrally located, beam-actuating rod. Spring 86 therefore biases ball valves 79 and 83 against their respective valve seats 78 and 84. The right hand end of section 88 is carried by a centering ring 89 identical with the ring 45 disclosed in Fig. 3. The right-hand end of chamber 76 is formed by a solid cap 90. From the chamber 76 outlet pipe 91 leads air to the air-operated, diaphragm motor 92 which actuates the final control valve 93.

*Operation*

The operation of the controller of this invention is as follows. Handle 1 is operated manually so that the output air pressure in pipe 12 and chamber 31 acts on diaphragm 32 and the first, central rod with a pressure which represents a desired value of the controlled variable being measured by measuring instrument 16. This value is the datum or base from which the deviation or variation of the controlled variable is measured. The air pressure which is set up in the outlet pipe 27 is proportional to the instantaneous value of the controlled variable as sensed by measuring instrument 16. It will be seen that the controlled-variable pressure in chamber 66 acts on the first, beam-actuating rod on the opposite direction to the set point pressure in chamber 31. Assuming the process to be in balance and the controlled variable and, consequently, the controlled-variable air pressure in chamber 66 to be at the set point, when the measuring instrument 16 senses a change in the controlled variable from that value to which the controller is set by manually-adjustable knob 1, the difference between resulting change in air pressure in chamber 66 and the set-point pressure in chamber 31 causes a movement of the first rod in one direction or the other and a consequent opening of inlet valve 40—41 or outlet valve 49—50. This causes the inlet or exhaust of air from chamber 37 and varies the pressure in chamber 37 in the direction or sense opposite to the variation in controlled-variable pressure in chamber 66. Diaphragm 36 acts on the first rod in the same direction as diaphragm 65, but since the change in pressure in chamber 37 is opposite to the change in pressure in chamber 66, the second movement of the first rod is a reverse or follow-up movement, opposite in direction to its initial movement in response to the change in the controlled-variable pressure. This follow-up movement closes that one of valves 40—41 and 49—50 which is opened. The change in air pressure in chamber 37 passes through conduit 52, capillary restriction 59, and conduit 60 to the divided chamber 61. Since the capillary restriction causes the flow through it to be proportional to the pressure drop across it, the rate of air flow through capillary 59 is proportional to the deviation and the rate of change of air pressure in the left hand part of chamber 61 and applied to diaphragm 62 is proportional to the deviation. The pressure applied to diaphragm 62 opposes the pressure applied to diaphragm 36. Therefore the third movement of the first rod is in the same direction as the initial movement in response to the change in the controlled-variable pressure. This third movement causes the same opening of inlet valve 40—41 or outlet valve 49—50 as was caused by the initial movement of the valve-actuating rod. A large number of cycles of these first, second, and third moves occurs and is not reversed or corrected until a sufficient variation in the process under control has occurred, which variation affects the measuring instrument 16 in the reverse direction or sense to the original change sensed by the measuring instrument 16. The air pressure in chamber 61 is applied to diaphragm 72 and consequently to the second, central rod. Diaphragms 72 and 74 simply form a pilot or relay having a one-to-one ratio. The purpose of these diaphragms is to seal the air in chamber 76 from the air in the divided chamber 61. This permits the volume of air in chamber 76 to be fixed and allows calibration of the capillary restriction 59 for any volume of the air-operated motor 92 which governs the final control valve 93. A change in pressure in chamber 61, as applied to diaphragm 72, moves the second, central rod and opens the inlet valve 78—79 or the outlet valve 83—84, whichever is appropriate, to correct the change in the process variable as originally sensed by the measuring element 16. The so-controlled air in chamber 76 passes through pipe 91 to the air-operated, diaphragm motor 92 which actuates the final control valve 93. Final control valve 93 is illustrated as being a typical final control element which directly changes the value of the manipulated variable or that quantity or condition which is varied by the automatic controller so as to affect the value of the controlled variable. Other types of final control element can be used.

Figs. 5, 6, 7 and 8 show other modifications of the bias provided between the valve operating member which actuates the valve flapper or pivoted beam and the valve flapper or other movable valve element actuated by said member.

Fig. 5 shows a pilot valve or relay similar to the first pilot valve or relay shown in Fig. 1 and consisting of elements 36—52. This pilot valve or relay comprises an inlet 500 for air or other operating fluid which communicates through restriction 501 with a pipe 502 having its outlet end formed by a nozzle 503 controlled by a flapper or similar movable valve element. Pipe 502 also communicates with the interior of a housing 504 in which is located a bellows 505 which has a mechanical connection 506 with a T-shaped, perforated, exhaust valve 507. Exhaust valve 507 is sealed, by means of a bellows 508, to a casing 509 in which is mounted a flapper 510 cooperating with the inlet end of exhaust nozzle 507 and with the inlet end of inlet nozzle 511.

Flapper 510 is pivoted against the ends of inlet nozzle 511 and of exhaust nozzle 507, in normal position, by means of spring 512 which is pivoted, at one end, to flapper 510 and, at its opposite end, to exhaust nozzle 507 or to a projection 513 extending therefrom. Thus spring 512 acts in the same way as does spring 49A of Fig. 1 to prevent "chattering" of flapper 510 with respect to nozzles 507 and 511. The controlled air pressure is led from the casing 509 through a port or conduit 599.

Fig. 6 shows a modified form of pilot or relay in which a pair of flappers are employed. In this modification, air enters through an inlet port 600 communicating with an inlet nozzle 611 controlled by a flapper 610. Flapper 610 is located in chamber 614 forming the central part of a casing 609. The end walls of chamber 614 are formed by a flexible bellows 615 and 616, respectively. Bellows 615 and 616 carry, at their movable portion, an actuating rod 617 having pins 618 and 619 secured to it. Exhaust nozzle 607 cooperates with a second flapper 610A. Control air, for example, may be admitted to chamber 627 to the left of diaphragm 615 while set point air can be fed to chamber 628 to the right of diaphragm 616. Springs 612 and 612A are each pivoted at one end to flapper 610 or 610A and at the opposite end to an attachment 613 secured to operating rod 617.

Upon a deviation of the pressure of the variable-controlled air in chamber 627 from the pressure manually selected for the set point air in chamber 628, diaphragms 615 and 616 cause rod 617 to move in one direction or the other so that pin 618 or 619 moves flapper 610 or 610A away from inlet port 611 or exhaust port 607 and thereby varies the controlled air pressure within chamber 614. This controlled air pressure is led off through a port or conduit 699.

Fig. 7 is a modification very similar to Fig. 6. Air passes from inlet 700 to an air inlet port 711 controlled by a ball or similar valve 750. Likewise, exhaust port 707 has its inlet controlled by a ball or like valve 751. Valves 750 and 751 may be spring biased to open position or may be mounted on valve actuating beam 710. Valve actuating rod 717 may be moved manually or by means of any convenient motor, such as an air-operated, diaphragm motor. Valve actuating beam 710 is pivoted on rod 717 at 752. Spring 712 is secured at one end to beam 710 and at its other end to rod 717 and stresses valves 750 and 751 to closed positions.

Assume that rod 717 is moved to the right in Fig. 7. Pivot 752 and spring 712 causes beam 710 to pivot on valve 751, which remains closed, while valve 750 opens inlet port 711. If rod 717 is moved to the left in Fig. 7, spring 712 and pivot 752 cause beam 710 to pivot around valve 750, which remains closed, while valve 751 opens the inlet to exhaust port 707.

Fig. 8 shows a manually operated pressure regulator. Air enters through inlet 800 to chamber 809A in casing 809. A valve seat 811 forms a passage between chambers 809A and 809B. The controlled air passes from chamber 809B through controlled air outlet 899. Manually operable handle 805 varies the pressure in a spring 806 which bears at its lower end against a perforated outlet port 807 mounted in a diaphragm 808 which forms a flexible wall of chamber 809B. A valve 813 has at its lower end a valve face 813A which cooperates with inlet port 811 and at its upper end a flat valve face 813B which cooperates with the lower or inner end of the perforation in exhaust port 807 and normally closes it. A tension spring 812 normally holds valve face 813 against the lower or inlet end of outlet port 807 thereby closing it. Spring 812 also normally holds a valve face 813A against inlet port 811 thereby closing it. These valves are shown in the drawings in open position for purposes of clarity.

While, in accordance with the provisions of the statutes, we have illustrated and described the best form of the invention now known to us, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described our invention, what we claim as new and desire to secure by Letters Patent is:

1. An air-controlling device including, a casing having a chamber therein and an outlet for controlled air therefrom, an inlet nozzle projecting into said chamber and forming an inlet for air thereto, an outlet nozzle projecting into said chamber and forming an outlet for air therefrom, a flapper mounted in said chamber and normally sealing both said inlet and said exhaust nozzles, an actuating element projecting into said chamber so as to move said flapper in response to a controlling variable, and a spring pivotally secured to said operating member and to said flapper and biasing said flapper into engagement with said nozzles.

2. A pilot valve, including in combination, a chamber having a movable wall responsive to pressure variations, a second chamber having an inlet nozzle communicating with a source of pressure, an exhaust nozzle attached to and movable with said movable wall and communicating with the atmosphere, means in said second chamber normally to close both of said nozzles, said means being moved in one direction by movement of the exhaust nozzle to open the inlet nozzle upon movement in said one direction of said wall and movement of said wall in the opposite direction serving to open said exhaust nozzle, and a spring connected to said exhaust nozzle and to said means and biasing said means to close both said inlet nozzle and said exhaust nozzle.

3. A pilot valve operated in response to measurements made of a condition to be controlled, said pilot valve including, a movable wall, an exhaust nozzle movable by said wall, first and second chambers divided by a partitional wall through which said exhaust nozzle extends, an air supply for one of said chambers, an inlet nozzle in said one chamber connected to said air supply, a flapper mounted in said one chamber and normally sealing both said inlet nozzle and said exhaust nozzle, and a spring secured to said exhaust nozzle and to said flapper and biasing said flapper into engagement with said nozzles.

4. A pilot valve, including, a movable wall, a tubular member attached thereto, a pair of chambers separated by a partition, said member extending through the partition from one of said chambers to atmosphere, a supply of fluid under pressure for said other chamber, valve means to close the opening of said member and to shut off the fluid supply to said chamber, and a spring secured to said member and to said valve means and biasing said valve means to shut off said fluid supply and to close off said member.

5. A non-leak pilot valve, including in combination, a chamber, an inlet nozzle in said chamber for supplying fluid under pressure to said chamber, an exhaust nozzle in said chamber, a pivoted valve member adapted to cover both of said nozzles simultaneously, means to move said valve member relative to said nozzles comprising at least a part of one of said nozzles, and a spring secured to said one of said nozzles and to said means to move said valve member and biasing said valve member into engagement with said nozzles.

6. A pilot valve, having in combination, a chamber one wall of which is moved in response to pressure changes therein, a second chamber in said pilot valve, an exhaust nozzle adjusted by said wall, said exhaust nozzle extending into said second chamber and controlling the flow of air from said second chamber, a supply of air for said second chamber, a valve in said second chamber to regulate said air supply and operated by said exhaust nozzle as the latter moves, a closure member for said exhaust nozzle attached to said valve, said exhaust nozzle moving into and out of engagement with said closure to control the flow of air through said inlet nozzle from said air supply, and a spring connected to said exhaust nozzle and to said closure member and biasing said closure member into engagement with said nozzle.

7. A non-leak pilot valve, including, a chamber, inlet and exhaust nozzles communicating with said chamber, one of said nozzles being movable relative to the other, common closure means for said nozzles, said closure means being constructed to close one or the other or both of said nozzles depending upon the position of said movable one of said nozzles, pressure responsive means arranged to move the movable one of said nozzles from a position in which both said nozzles are closed to a position in which one or the other of said nozzles is closed depending upon whether the pressure acting on said pressure responsive means is increased or decreased, and a spring pivotally secured to the movable one of said nozzles and to said closure means and biasing both said nozzles to closed position.

References Cited in the file of this patent
UNITED STATES PATENTS

| | | |
|---|---|---|
| 608,397 | Schwartz | Aug. 2, 1898 |
| 1,606,426 | Justen | Nov. 9, 1926 |
| 1,836,740 | Albers | Dec. 15, 1931 |
| 2,275,712 | Zand | Mar. 10, 1942 |
| 2,380,983 | Mock | Aug. 7, 1945 |
| 2,588,839 | Horn | Mar. 11, 1952 |
| 2,618,155 | Conner | Nov. 18, 1952 |
| 2,638,117 | Horn | May 12, 1953 |
| 2,646,025 | Deardorff | July 21, 1953 |
| 2,660,834 | MacGlashan | Dec. 1, 1953 |
| 2,685,342 | Lauck | Aug. 3, 1954 |
| 2,700,374 | Jacobsen | Jan. 25, 1955 |
| 2,729,223 | Rosenberger | Jan. 3, 1956 |
| 2,741,460 | Gardner | Apr. 10, 1956 |
| 2,800,913 | Swartwout et al. | July 30, 1957 |
| 2,805,647 | Ingres | Sept. 10, 1957 |